United States Patent

[11] 3,530,819

| [72] | Inventor | Henry J. Modrey<br>158 Eagle Drive, Stamford, Connecticut 06903 |
|---|---|---|
| [21] | Appl. No. | 790,208 |
| [22] | Filed | Jan. 10, 1969 |
| [45] | Patented | Sept. 29, 1970 |
| [32] | Priority | Nov. 13, 1968 |
| [33] | | Great Britain |
| [31] | | 53,782/68 |

[54] BEARING ASSEMBLY
17 Claims, 11 Drawing Figs.

[52] U.S. Cl. .................................................. 114/144, 308/36.1
[51] Int. Cl. ...................................................... B63h 25/22
[50] Field of Search .......................................... 308/36.1, 36.3; 277/56

[56] References Cited
UNITED STATES PATENTS

| 821,925 | 5/1906 | Collier | 308/36.1 |
|---|---|---|---|
| 1,294,162 | 2/1919 | Pratt | 114/150 |
| 2,713,522 | 7/1955 | Petch | 308/36.1 |
| 3,058,791 | 10/1962 | Stallman | 277/208 |
| 3,206,998 | 9/1965 | Matz, Jr., et al. | 114/144 |

FOREIGN PATENTS

| 448,650 | 4/1968 | Switzerland | 277/56 |
|---|---|---|---|
| 494,349 | 4/1927 | Germany | 277/56 |

*Primary Examiner* — Wesley S. Ratliff, Jr.
*Attorney* — Hane and Baxley

ABSTRACT: This disclosure teaches a seal and bearing (or bushing) arrangement suitable for marine and comparable applications, and particularly a stern tube bearing and sealing assembly. A supporting member has an internally threaded mounting hole with a bearing insertable therein. The bearing comprises a coil spring externally defining a screw thread engageable with a thread of the mounting hole. Internally the coil spring describes a continuous axially aligned land which forms a cylindrical bearing (or bushing) for a shaft or rod. A continuous helical path provided between the thread of the coil spring and that of the mounting hole causes circulation of a lubricant about the shaft or rod with or without an external lubricating circuit. Helical sealing elements are positioned in the thread of the mounting hole snugly engaging the shaft or rod to close off the axial ends of said path. End plates secure the sealing elements in position. These plates can be rotated to tighten the coil spring and sealing elements if desired.

FIG. 1

Patented Sept. 29, 1970

INVENTOR.
HENRY J. MODREY
BY
ATTORNEYS

INVENTOR.
HENRY J. MODREY
BY Hane and Baxley
ATTORNEYS

INVENTOR.
HENRY J. MODREY
BY Heine and Baxley
ATTORNEYS

BEARING ASSEMBLY

BACKGROUND

The present invention relates to seal and bearing (or bushing) arrangements for rotatably and/or slidably seating a shaft or rod while preventing fluid flow therealong, and particularly to a stern tube sealing and bearing assembly and a steering mechanism for a rudder.

As used throughout this specification reference to a bearing for rotatably seating a shaft should also be construed to include a bushing for lengthwise slidably engaging a shaft or rod. What is herein stated with regard to stern tube seal and bearing assemblies applies with comparable pertinence to various marine as well as other seal and bearing or bushing applications.

Increased horsepower of modern vessels, with resultant higher speeds, aggravates wear on seal and bearing assemblies. High capital costs and expenses, which modern vessels entail, dictate that time devoted to maintenance, repair and/or replacement of these assemblies be cut to a minimum.

Seals for known stern tube assemblies include one or more tetrafluoroethylene rings, with or without neoprene diaphragms. Tetrafluoroethylene rings with pressure plates have also been employed. However, these arrangements have not kept pace with increased horsepower of modern vessels, and as time goes by they are less apt to keep up.

Bearings for stern tube assemblies are usually cast Babbitt metal. These castings are often made in a number of pieces, which weakens strength. Another problem with conventional stern tube bearings is to assure proper lubrication. The lubricant enters the bearing in one or several spots and its distribution along the shaft is therefore irregular. When a shaft begins to turn, especially after a period of rest, dry spots may cause tears.

SUMMARY

The present invention approaches a seal and bearing (or bushing) arrangement for maritime and similar applications in a novel and facile way. As indicated in the foregoing abstract a coil spring bearing is engageable in a threaded mounting hole. The coil spring is organized to engage the thread of the mounting hole, form an internal bearing surface for the shaft (or rod) and accommodate circulation of a suitable lubricant. Sealing is provided by elements positioned in the threads of the mounting hole preferably at both ends of the coil spring.

The basic object of this invention is to minimize the time needed for maintenance, repair and/or replacement of seal and bearing or bushing arrangements.

A further object is to eliminate split castings in the manufacture of stern tube assemblies.

A further object is to dissipate friction heat of bearings. This heat dissipation is promoted by heat transfer to a circulating lubricant. In this regard by use of a slotted bearing of the present invention, heat dissipation is much better than with a solid bearing. The lubricant reaches not only the actual bearing surface but all sides of the slotted bearing so that lubricant circulation cools the bearing in a far more perfect manner than in prior art bearings.

A further object is to improve lubrication of shafts or rods (thus avoiding dry spots or irregular lubrication) by providing flow of a lubricant all around the shaft in a continuous helical path between threads of the mounting hole and those of the coil spring. Slight movements of the coil spring occasioned by movement of the shaft also assist distribution of the lubricant by releasing lubricant from the thread. This improved lubrication contrasts markedly with ordinary bearings wherein a lubricant enters at only a few points. Lubrication according to this invention may fairly be termed "demand lubrication."

A further object is to provide a relatively viscous fluid (the lubricant) retained by the sealing members and interposed in the path of fluids subjected to relatively high pressure gradients so that pressure losses may be reduced.

A further object is to provide a bearing (or bushing) which can be manufactured precisely using inexpensive production methods. As will be pointed out more fully hereinafter, wire from which the coil spring is wound can be drawn readily to precise tolerances and it can be wound conveniently. As a result the precision work necessary to obtain the bearing of this invention generally can be accomplished using a drawing die and a spring winder. Comparable precision using prior known assemblies would require much more expensive manufacturing procedures.

A further object is to provide a bearing or bushing which has considerably inherent resilience, whereby friction between the supporting member and the seated member is reduced and danger of binding or seizing of the seated member is virtually eliminated. Furthermore, the inherent resilience of the coil compensates automatically for misalignment or bending of a seated member within a comparatively wide range.

A further object is to provide a bearing (or bushing) in which the clearance is self adjusting due to inherent capability of the bearing to adjust itself to slight variations in the diameter of the shaft to be seated therein. The bearing will expand or contract when the shaft expands or contracts.

A further object is to achieve the effect of multiple seal rings by using as many turns of a tetrafluoroethylene sealing member as are desirable to fill threads of the mounting hole at the ends of the coil spring.

A further object is to provide a seal which fits into the screw thread of the mounting hole which is already provided; thus, effecting a considerable economy over known seals.

A further object is to accommodate tightening of seal members and the coil spring by rotating an adjusting plate which abuts an end of one of the seal members.

A further object is to have seal and bearing (or bushing) assemblies adaptable to a wide variety of shipboard uses whereby the necessity for stocking a multiplicity of spare parts is obviated. As for the seal, a replacement coil of extruded tetrafluoroethylene rod of appropriate cross section would be inserted into the screw thread of the mounting hole. Other than the replacement coil itself, no separate replacement seal parts are required.

A further object, in accordance with specific requirements of the contemplated application of the seal and bearing (or bushing) arrangement of this invention, is to accommodate selection of materials from a wider variety of hardnesses, friction coefficients and costs.

A further object of this invention is to provide a seal and bearing (or bushing) assembly which is rugged, able to withstand abusive conditions and is otherwise well suited to its intended function.

A further object is to apply this invention in an inside-out fashion to a piston, whereby the piston is threaded externally with a coil spring engaged in the thread. Here sealing members snugly engage a cylinder wall.

DRAWINGS

Other and further objects, features and advantages of this invention will be pointed out hereinafter and set forth in the appended claims forming part of the application. In the accompanying drawings several embodiments of the invention are shown by way of illustration and not by way of limitation.

Figure 7A:
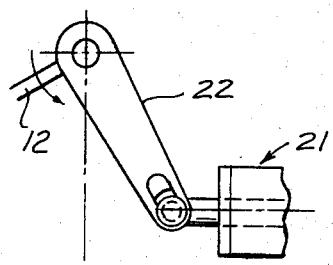
Figure 7:
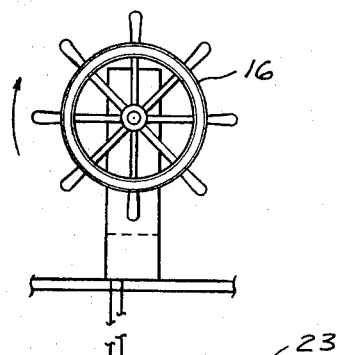

FIGS. 7 and 7A comprise a schematic representation of a seal and bushing assembly for use in a steering system operated by means of an axially translatable rod.

Figure 8:
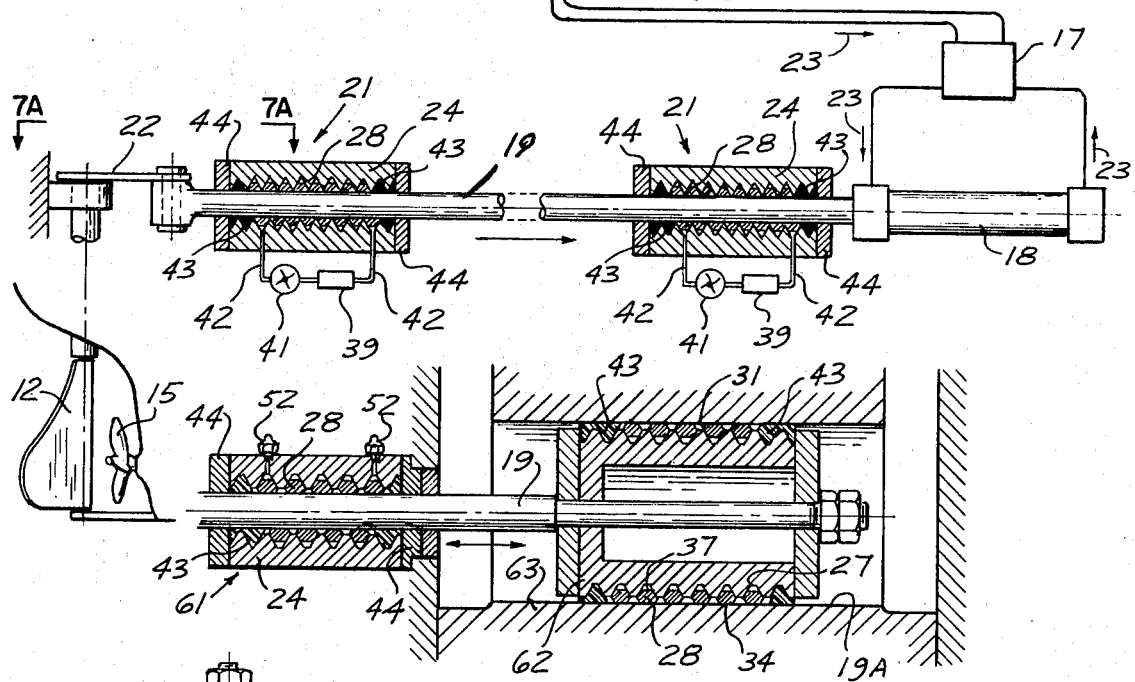

FIG. 8 illustrates application of this invention to a piston in inside-out fashion as well as to seal and bushing assembly.

Figure 9:
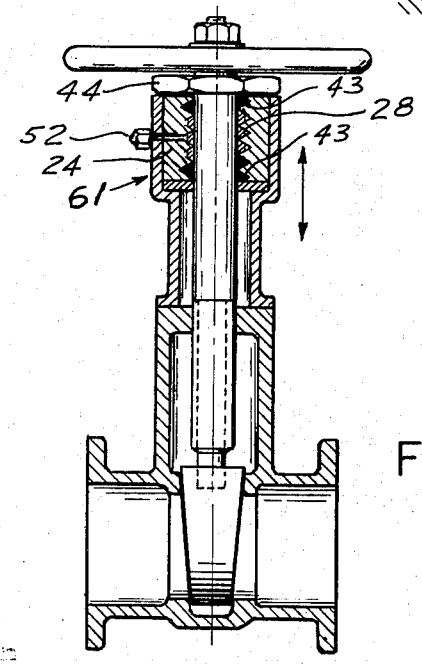

FIG. 9 shows this invention applied to a stuffing box of a valve.

Figure 10:
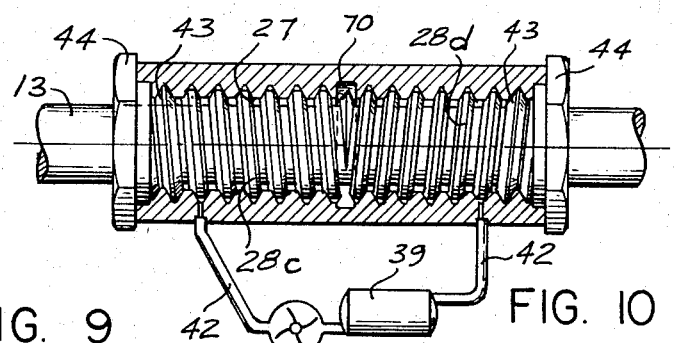

FIG. 10 is an elevation view partly in section showing this invention with bearing spring coils engaged in abutting left and right hand thread arrangements.

PREFERRED EMBODIMENTS

Figure 1:
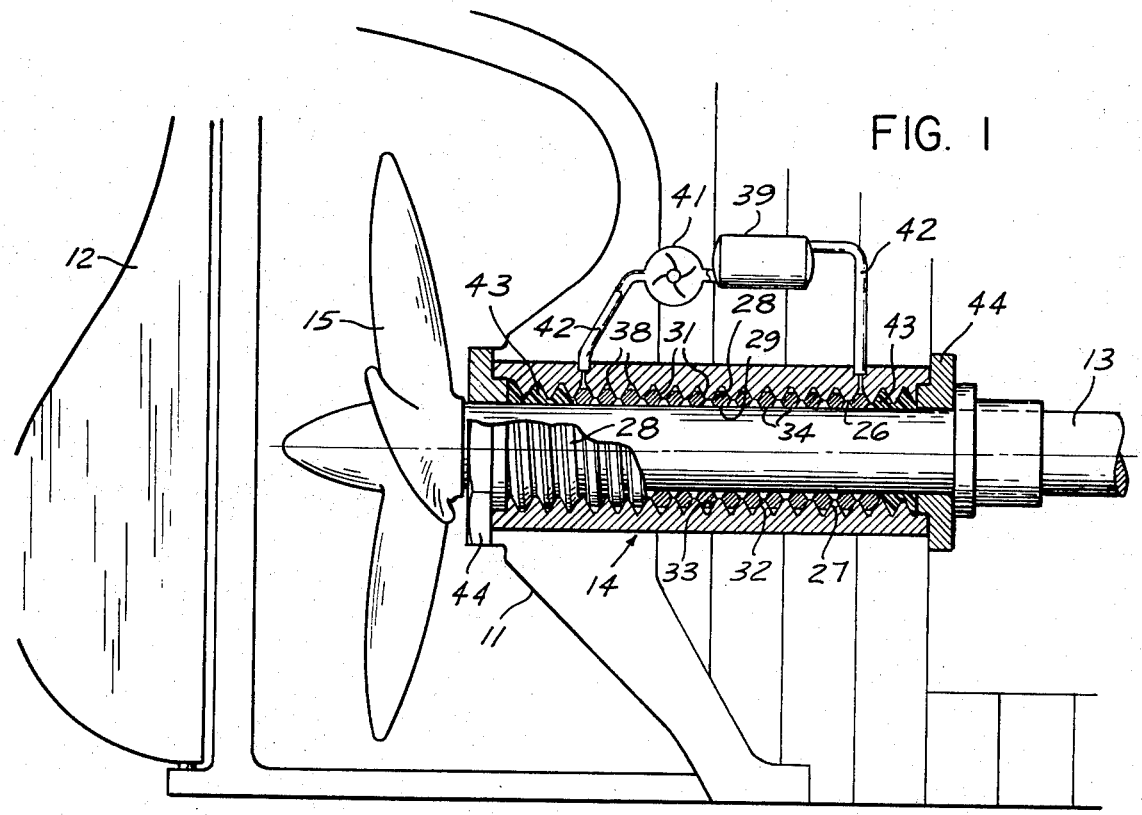
FIG. 1 is a broken, partly sectioned and somewhat schematic view of a stern tube bearing and seal assembly according to this invention and reflects the overall relationship of the assembly to the stern of a ship.

Referring to the figures in detail, FIG. 1 generally represents the stern of a ship with a stern boss 11 and rudder 12. Shaft 13 penetrates stern boss 11 by means of a stern tube seal and bearing assembly generally designated 14 to rotate screw propeller 15. In FIG. 7 a steering arrangement is schematically represented with wheel 16 communicating with power unit 17 (equipped with two-way valves, not shown) to control the pumping of oil for operation of hydraulic ram 18, thereby axially translating rod 19 via seal and bushing assemblies generally designated 21 to move linkage 22 for turning rudder 12 starboard. Arrows 23 would be reversed for a turn to port. It should be kept in mind that the invention contemplates a seal and bearing assembly 14 for service with a rotatable shaft 13 as shown in FIGS. 1, 2, 3, 4, 5 and 10 as well as a seal and bushing assembly 21 for service with a rod 19 as shown in FIGS. 7, 8 and 9 as well as a piston application shown in FIG. 8.

Support members 24 have a threaded mounting hole 26. Thread 27 is shown as sharp-edged, but a thread of another configuration, such as blunted squared or rounded thread, may also be provided. The material from which support member 24 is made may be selected in accordance with the specific requirements of its application. The various support members 24 shown throughout the figures demonstrate the versatility of this invention, but their specific configuration is not essential to the invention itself. In other words the shape of the support member 24 for either a bearing 14 or a bushing 21 may be chosen in accordance with its specific application and the support member may be stationary or movable. Member 24 of FIG. 1 and the companion figures constitutes a stern tube.

Bearings (or bushings) according to this invention are formed by coil spring 28 having any desired pitch and number of windings. The material from which coil spring 28 is wound may also be selected in accordance with specific requirements of its application. However, the material must be suitable for extruding, so as to form the appropriate cross-sectional configuration. Bronze alloys are preferred for this purpose as they combine excellent ductility with low friction. The cross-sectional configuration of spring coil 28 is generally that of a truncated pyramid and is selected so that inwardly facing surface 29 defines a cylindrical bearing surface and, more specifically, a spirally slotted cylindrical bearing surface. The outwardly facing surface of spring coil 28 forms screw thread 31 engageable with thread 27 of mounting hole 26 to anchor the bearing (or bushing) in support member 24. As is evident from FIGS. 1, 2, 3, 5, 6 and 10; friction between flanks 32 of coil spring 28 and flanks 33 of thread 27 in mounting hole 26 will generally restrain coil spring 28 against rotation when shaft 13 turns. Holding friction may be increased by notching flanks 32 of coil spring 28 with a view toward increasing adhesion friction.

The outer surface of coil spring 28 defining external thread 31 may be pointed, but it is generally more convenient and advantageous for a reason which will be pointed out hereinafter to blunt or flatten external thread 31, whereby the spring coil has the illustrated shape of approximately a trapezium or truncated triangle.

To attain the desired bearing or bushing function of coil spring 28 on the inside thereof, the inwardly facing surface portion of each of the windings may be regarded to form a land 34. Each of the lands 34 constitute part of cylindrical surface 29 and all of these lands 34 are axially aligned whereby they conjoin to form spirally slotted cylindrical bearing surface 29. Generally this bearing (or bushing) will be reamed to precise size after the coil spring has been installed. It should be noted that this slotted bearing (or bushing) has much better heat dissipating ability than a solid bearing (or bushing). Moreover, because the lubricant penetrates not only the bearing (or bushing) surface but also all sides of the bearing (or bushing), the lubricant circulation cools the bearing (or bushing) in a far more perfect manner than by prior art devices.

Figure 5:
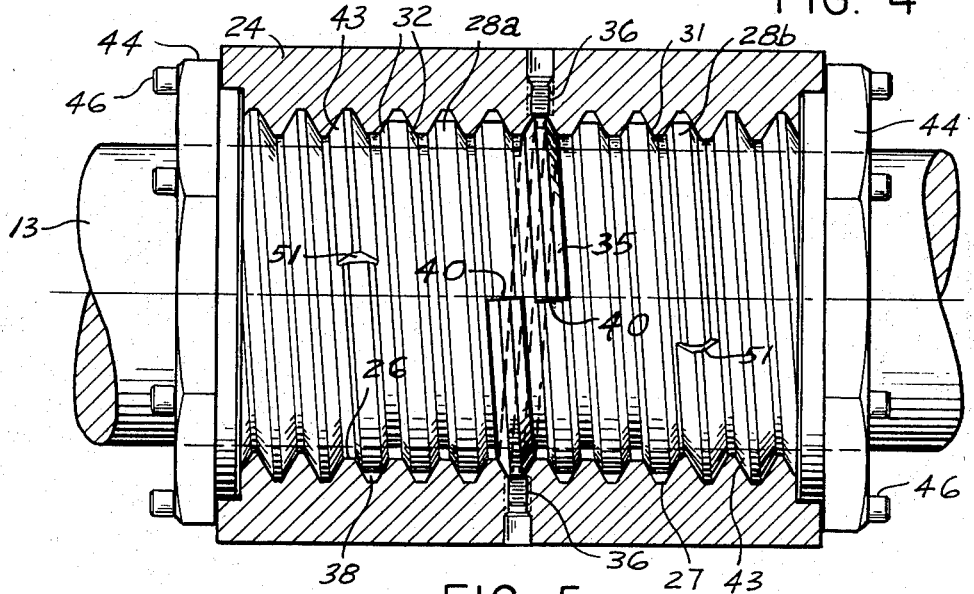
FIG. 5 is a broken elevation view and partly in section showing pin screws which insure central mounting of the bearing coil.

Coil spring 28 has a certain limited amount of give in relation to rod 19 or shaft 13 because it is the nature of coil spring 28 that increased radial pressure in one spot becomes translated into elongation of the coil spring. For example, if one end of shaft 13 should be 1 millimeter out of alignment, this 1 millimeter is reduced to an infinitesimal fraction of 1 millimeter translated to the total length of coil spring 28. As a result, individual windings of coil spring 28 may perform limited movements within thread 27. Thus, a bearing (or bushing) according to the invention has inherently considerable elasticity or give which reduces friction and prevents binding of shaft 13 or rod 19. As shown in FIG. 5, the bearing coil comprises two halves 28a and 28b of the same hand. A short stop coil 35 is interposed between the coil halves and abuts at its ends 40 against the inner ends of the coil halves to locate the same within support member 24. Dog nose set screws 36 engage holes (not shown) in coil 35 to lock the coil halves and the stop coil in position.

Figure 2:
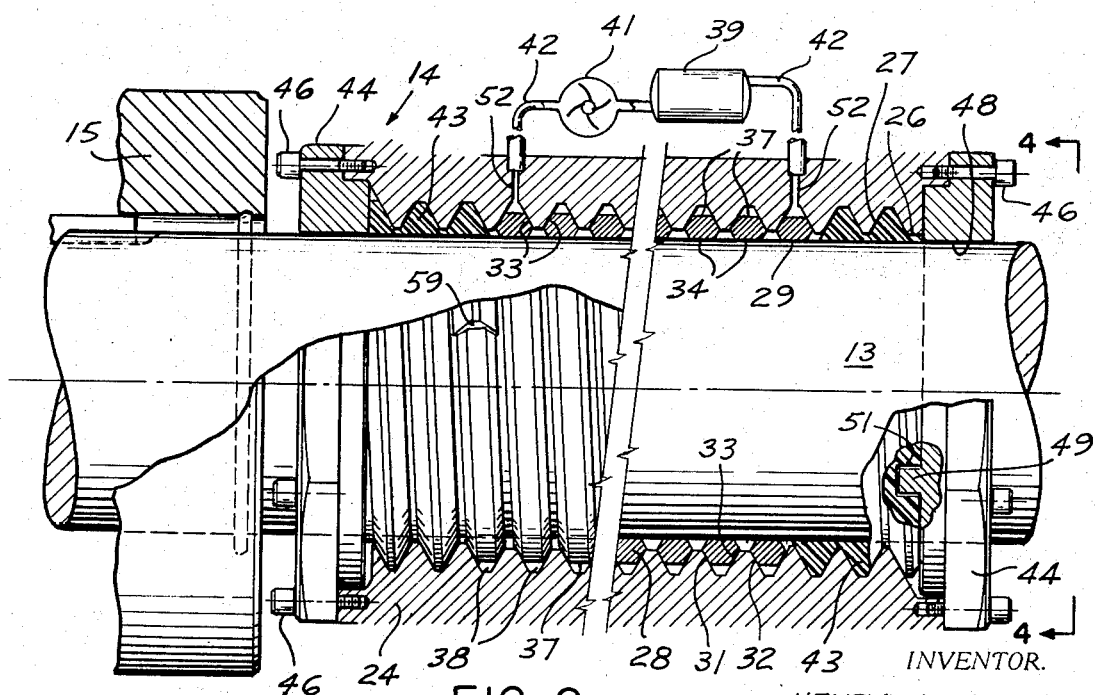
FIG. 2 is a broken, partly sectioned and somewhat schematic view illustrating the use of this invention as a bearing.
Figure 3:
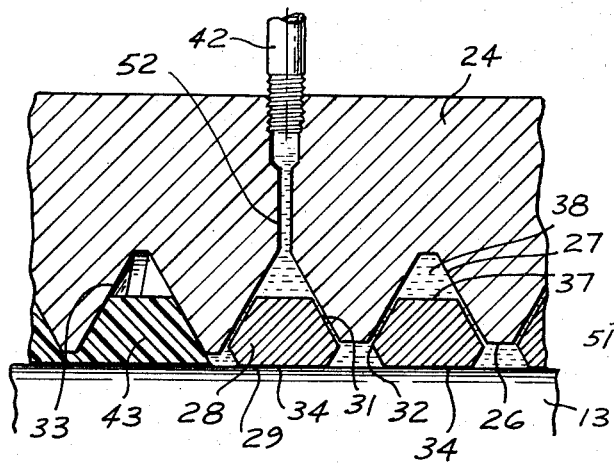
FIG. 3 is an enlarged and broken detail showing access of lubricant to the bearing surface and shaft interface.
Figure 6:
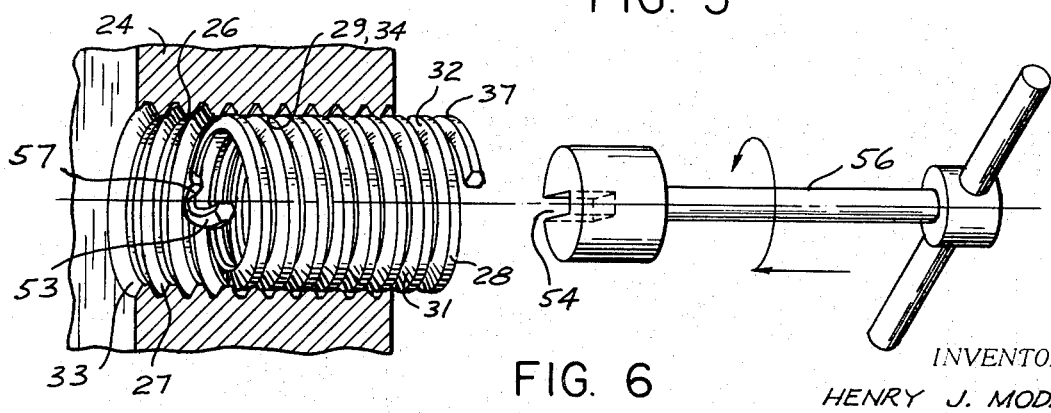
FIG. 6 shows a bearing coil equipped with a drive tang, as well as a tool for engaging the tang during its insertion.

As shown in FIGS. 3 and 6, a flattened thread 37 on the outside of coil spring 28, together with flanks 33 of pointed threads 27 in mounting hole 26, define a continuous spiral or helical lubricant path or space 38 of triangular cross-sectional configuration. As seen in FIGS. 1, 2 and 7 this lubricant space 38 is utilized to circulate a suitable lubricant supplied from lubricant reservoir 39 and circulated by pump 41 via lubricant lines 42. The lubricant reaches the interface between lands 34 and shaft 13 or rod 19 partially due to slight displacements of the windings of coil spring 28 within thread 27 of mounting hole 26 as shaft 13 is rotated or rod 19 is lengthwise displaced in bearing 14 or bushing 21 respectively; for this reason bearings 14 of FIGS. 1, 2 and 10 or bushing 21 of FIGS. 7, 8 and 9 are self-lubricated.

The lubricant is retained in lubricant space 38 by sealing members 43 snugly engageable in thread 27 of mounting hole 26 to embrace shaft 13 or rod 14 respectively. Although coil spring bearing 28 has a cross-sectional configuration in the form of a trapezium which leaves continuous lubricant space 38 in its missing apex, seal members 43, which are likewise extended rod members, have cross-sectional configurations which are full triangles and which fill the thread space of support member 24. Seal members 43 are extruded. It has been found that in some cases sealing members 43 are not necessary and hence may be omitted.

Figure 4:
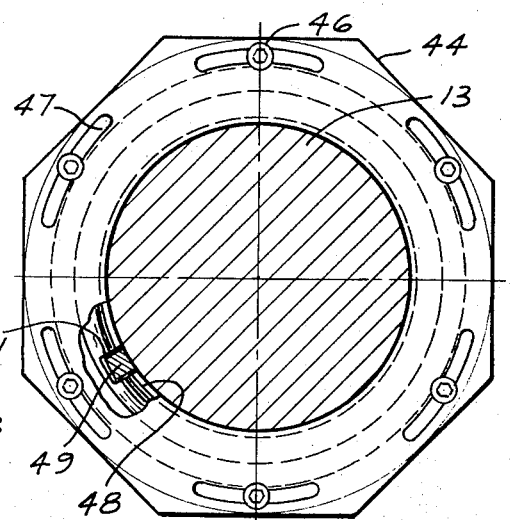
FIG. 4 is a broken section taken along line 4–4 of FIG. 2 and along with FIG. 3 depicts the operative relationship of seal adjustment plate to the seal and bearing or bushing arrangement of this invention.

As best seen in FIGS. 2 and 4, seal adjustment plates 44 are positioned at both ends of bearings or bushings respectively and are connected to support member 24 by means of screws 46 which penetrate elongated slots 47 in adjustment plates 44. Adjustment plates 44 are polygonal in cross-sectional configuration (preferably hexagonal or octagonal) so that they can be turned by a large wrench. Adjustment plates 44 are provided with bosses 49 which engage in slots 51 of sealing members 43 so that on turning either or both of the adjustment plates 44, the degree of compression on sealing members 43 can be regulated thereby tightening or loosening engagement of sealing members 43 on shaft 13 or rod 19 and tightening or loosening engagement of coil spring 28.

Detailed structure of spring coil 28 and its relationship to thread 27 of mounting hole 26 is shown in FIG. 3. Lubricant enters via tap 52 and circulates through continuous helical lubricant space 38 so that the lubricant is free to penetrate the interface between lands 34 and shaft 13 (or rod 19).

FIG. 6 shows a coil spring partially inserted in the thread of support member 24. To facilitate such insertion, coil spring 28 terminates at one end in transverse tang 53 which may be gripped in slot 54 of tool 56 to screw spring coil 28 into thread 27 of mounting hole 26 in the same manner as any threaded member may be screwed in. Turning tends to reduce the coil spring diameter which relieves friction and makes installation easier. Upon completion of insertion, tang 53 is cut off. To make removal of tang 53 more convenient, it is notched at 57.

As shown in FIG. 1 this invention finds a prime embodiment in stern tube seal and bearing assembly 14 which permits penetration of shaft 13 through stern boss 11 for turning screw propeller 15. In this application inboard adjustment plate 44 is accessible from a shaft alley.

FIG. 2 represents a bearing and seal arrangement 14 depending from support member 24. The abutment of coil spring 28 with seal member 43 is designated 59. Seal members 43 fill the full section of thread 27 in mounting hole 26. Adjustment plates 44 are rotatable to move boss 49, engaging sealing members 43 and thereby longitudinally compressing coil spring 28. A lubricant circulates through lubricant space 38, lubricant reservoir 39 and lines 42. The lubricant is pressurized by pump 41.

FIGS. 7 and 7A schematically represent a steering system operated by means of axially translatable rod 19. Power unit 17 is responsive to rotation of wheel 16 to regulate pumping of a fluid to either the projection side or the retraction side of a piston in hydraulic ram 18 by virtue of which rod 19 is translated through seal and bushing arrangements 21. By means well known in the art, rod 19 translates linkage 22 to turn rudder 12.

In FIG. 8 the present invention is applied to a stuffing box generally designated 61 and also by inside-out reversal to piston 62 of a dual action reciprocating pump. In the reciprocating pump, piston cylinder wall 19A compares with the surface of rod 19 in FIGS. 7 and 9 as well as in stuffing box 61 of FIG. 8. For simplicity the inlet and outlet arrangements on either side of piston 62 are deleted from the reciprocating pump. Stuffing box 61 is provided with grease nipples 52 which permit lubricant to be pressed into bushing 21. Coil spring 28 is wrapped about piston 62 and engages thread formed thereon. In piston 62 coil spring 28 is impregnated with a suitable lubricant. Stuffing box 61 can be used for reciprocating rods of a variety of types such as steam, electric, diesel, combustion, pneumatic and other engines. Piston 62 is applicable to hydraulic, steam, pneumatic or other pumps. Piston 62 replaces conventional piston rings by continuous turns of seal members 43 helically disposed in thread 27. In this application cylinder 63 is an inside-out embodiment of rod 19 as used in FIG. 7.

As to bearing (or bushing) aspect of this invention, rather than its sealing aspect, the lubricant circuit continues from pump 41 through helical lubricant space 38 and back to pump 41. The interface between a shaft 13 (or rod 19) and bearing 14 (or bushing 21) is closed by a spiral oil film. This contrasts markedly with conventional bearings (or bushings) wherein lubricant enters the interface between shaft 13 (or rod 19) and bearing 14 (or bushing 21) at assorted spots only.

The lubricant circuit has herein been treated only as a lubricating medium. But this lubricant circuit also acts as a continuous liquid seal and as such is very important for pneumatic pumps and for refrigeration pumps in which maintenance of pressure differentials has been difficult. In conjunction with the piston assembly of FIG. 8 it is important to realize that a continuous liquid sealing medium is present in this invention by virtue of a relatively viscous and confined lubricant circuit. The presence of this liquid seal also counteracts entry of fluids, for example, in FIG. 1. Accordingly it may be broadly stated that this feature of sealing is important not only for pressure and vacuum pumps but also for the applications shown in FIG. 1 and FIG. 7.

FIG. 9 depicts the application of this invention to stuffing box 61 of a slide gate valve. A slide gate valve is typical for large valve installations using a sealed bushing. Stuffing box 61 is provided with a single grease nipple 52 for injection of lubricant. Also a single adjustment plate 44 is furnished to tighten sealing members 43 and coil spring 28. In other respects this valve is conventional.

Referring now to FIG. 10 more in detail, this figure shows a seal and bearing assembly in which the bearing coil spring is divided into two parts 28c and 28d, one part being left hand wound and the other right hand wound. The two spring parts meet in the middle of support member 27 in radial registry with a circumferential groove 70 in the inner wall of the support member.

It has been found that particularly in large bearings the shaft surface may be imperfectly machined and be left with slight spiral grooves. Such grooves constitute in effect a very shallow thread and the resulting archimedian screw effect may cause a forcible conveyance of the oil toward the respective shaft end within the bearing assembly. Tests have shown that on a shaft with a diameter of about 3 feet the screw effect and the resulting back pressure may be powerful enough to override the action of the oil pump trying to pump oil through the lubricating path in opposition to the thread. The oppositely wound screw parts of FIG. 10 serve to counteract the screw effect caused by imperfections in the machining of the shaft.

The seal and bearing assembly as shown in FIG. 10 may be used in the assembly of FIG. 1 or wherever there is likelihood that a screw effect as explained may occur.

I claim:

1. A sealing and bearing assembly comprising in combination an internally threaded tubular member; a bearing coil spring inserted into said member, said bearing coil spring externally defining a screw thread engaged with the thread of the tubular member and internally defining axially aligned lands, said lands in conjunction forming a cylindrical spirally slotted bearing surface for displaceably seating a cylindrical member therein, the maximum outer diameter of the thread of said coil spring being less than the maximum inner diameter of the thread of the tubular member thereby forming between the tubular member and the coil spring a continuous path for a lubricant; a sealing member adjacent to each end of the coil spring, each of said sealing members engaging a respective thread portion of said tubular member substantially filling the engaged thread portion and snugly engageable with a seated cylindrical member for sealing said lubricant path at both ends thereof; and locking means at each end of said tubular member for locking the sealing members in position.

2. The assembly according to claim 1 wherein each of the locking means comprises an annular plate generally normal to and providing space for passage of the cylindrical member, said plate having a boss projecting from the plate into pressure abutment with the respective sealing member.

3. The assembly according to claim 1 wherein circulating means are connected in a flow series with substantially opposite ends of said lubricant path for circulating a liquid lubricant therethrough.

4. The assembly according to claim 1 wherein said sealing members are made of tetrafluoroethylene.

5. The assembly according to claim 4 wherein said thread of the tubular member is of substantially triangular cross-sectional outline, and said coil spring is wound of wire having a cross-sectional configuration approximately defining a trapezium with its wide side facing inwardly and axially aligned to define said spirally slotted cylindrical bearing surface and its narrow side facing outward to define a blunted screw thread engageable with the thread of the tubular member, said thread of the coil spring in conjunction with the thread of the tubular member forming a continuous helical gap constituting said lubricant path.

6. A marine seal and bearing assembly comprising, in combination an internally threaded bearing tube; a bearing coil spring screwed into said bearing tube; said coil spring externally defining a screw thread engaged with the thread of the tube and having an inwardly facing side axially aligned to define generally a cylindrical spirally slotted bearing surface; a shaft seated in said bearing coil, the maximum outer diameter of the thread of said bearing coil being less than the maximum inner diameter of the thread of the bearing tube thereby forming between the tube and the bearing coil a continuous path for a lubricant; a sealing member engaged in a thread portion of said bearing tube adjacent to each end of the coil spring substantially filling the engaged thread portion and snugly engaged with the shaft seated in said bearing coil; and locking means at each end of said bearing tube for locking the sealing members in position.

7. The assembly according to claim 6 wherein each of the locking means comprises an annular plate generally normal to and providing space for passage of the bearing tube, said plate having a boss projecting from the plate into pressure abutment with the respective sealing member.

8. The assembly according to claim 6 wherein said sealing members are made of tetrafluoroethylene.

9. The assembly according to claim 6 wherein circulating means are connected in a flow series with substantially opposite ends of said lubricant path for circulating a liquid lubricant therethrough.

10. The assembly according to claim 6 wherein said thread of the bearing tube is of substantially triangular cross-sectional outline and the bearing coil is wound of wire having a cross-sectional configuration approximately defining a trapezium with its wide side facing inward and axially aligned to define a spirally slotted cylindrical bearing surface and its narrow side facing outward to define a blunted screw thread engaged with the thread of the tube, said thread of the bearing coil in conjunction with the thread of the tube forming a continuous helical gap constituting said lubricant path.

11. The assembly according to claim 6 wherein said bearing tube is a stern tube and said shaft is a propeller shaft.

12. The assembly according to claim 6 wherein said shaft is an axially displaceable control shaft of a ship steering mechanism and is coupled to a linkage converting a linear movement of the shaft to a pivotal rudder movement.

13. A piston and cylinder assembly, wherein the piston has an external screw thread and comprising a coil spring accommodated within the screw thread with its outer surface constituting a series of axially spaced lands which form a cylindrical bearing surface with the inner wall of the cylinder, the bearing surface being interrupted by a helical slot extending between the lands and the inner portions of the convolutions of the coil spring being spaced from the roots of the screw thread to form between the piston and the coil spring a helical path for lubricant, and sealing members which are disposed at opposite ends of the piston in abutment with the ends of the coil spring and formed with internal screw threads which substantially fill the end portions of the screw thread in the piston, and constitute piston rings for the piston.

14. The assembly according to claim 1 wherein said bearing coil spring comprises two coil parts of the same hand and a further bearing coil part is interposed between the outer coil parts with the respective ends of the three coil parts in abutment, and wherein set screw means engage said interposed coil part thereby locking the three coil parts in position within said tubular member.

15. The assembly according to claim 1 wherein said bearing coil spring comprises two axially abutting spring parts, one of said parts having a left hand thread and the other a right hand thread, said tubular member having in its inner wall a peripheral groove in radial alignment with the abutting ends of said spring parts.

16. The assembly according to claim 15 and further comprising circulating means connected in a flow-series with said lubricant path on opposite sides of said groove for circulating a liquid lubricant through said lubricant path.

17. A bearing comprising a tubular member having a cylindrical bore formed with an internal screw thread, a coil spring accommodated within the screw thread with its inner surface constituting a series of axially spaced lands which form a cylindrical bearing surface for a shaft inserted into the bearing, the bearing surface being interrupted by a helical slot extending between the lands and the outer portions of the convolutions of the coil spring being spaced from the roots of the screw thread to form between the tubular member and the coil spring a helical path for lubricant, and sealing members which are disposed in opposite ends of the tubular member in abutment with ends of the coil spring and are formed with external screw threads which substantially fill the end portions of the screw thread in the tubular member.